(12) United States Patent
Linari et al.

(10) Patent No.: US 12,711,537 B2
(45) Date of Patent: Aug. 18, 2026

(54) SECURED ACCESS AND MANAGEMENT OF SHARED STORAGE RESOURCES

(71) Applicant: T-Mobile USA, Inc., Bellevue, WA (US)

(72) Inventors: John C. Linari, Seattle, WA (US); Amit Kumar Mannur, Bellevue, WA (US); Beth Ellen Turtle, Woodinville, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 355 days.

(21) Appl. No.: 18/335,867

(22) Filed: Jun. 15, 2023

(65) Prior Publication Data

US 2024/0420218 A1 Dec. 19, 2024

(51) Int. Cl.
*G06Q 30/00* (2023.01)
*G06Q 30/0601* (2023.01)

(52) U.S. Cl.
CPC ................................ *G06Q 30/0633* (2013.01)

(58) Field of Classification Search
CPC ............... G06Q 30/00; G06Q 30/0601; G06Q 30/0611; G06Q 30/0635; G06Q 30/0641; G06Q 30/0645
See application file for complete search history.

(56) References Cited

U.S. PATENT DOCUMENTS 7,739,308 B2 6/2010 Baffier et al.
8,380,880 B2 * 2/2013 Gulley .................. G06F 9/5055 709/227
8,812,424 B2 8/2014 Breiter et al.
9,172,621 B1 10/2015 Dippenaar
(Continued)

FOREIGN PATENT DOCUMENTS

CN 111340467 A 6/2020
CN 112365294 A 2/2021
(Continued)

OTHER PUBLICATIONS

Wang, Juntao, et al. "When group-buying meets cloud computing." IEEE Infocom 2016—The 35th Annual IEEE International Conference on Computer Communications. IEEE, 2016. (Year: 2016).*
(Continued)

*Primary Examiner* — Christopher B Seibert
(74) *Attorney, Agent, or Firm* — Ashurst Perkins Coie US LLP

(57) ABSTRACT

This document describes techniques, apparatuses, and systems for secured access management of shared storage resources. A first user issues a command to create a shared storage resource that is capable of saving an indication of products available for acquisition on a platform for later acquisition using a billing account with which the first user is authorized to acquire products. The first user issues a command to provide a second user a set of permissions that enables the second user to issue commands to add an indication of one or more products to the storage resource. Using the permission, the second user issues commands to add the indication of the one or more products to the storage resource. The one or more products can be acquired using the billing account based on the indication of the one or more products in the storage resource.

9 Claims, 6 Drawing Sheets

(56) References Cited

U.S. PATENT DOCUMENTS 9,473,504 B2 10/2016 Sundaresan et al.
9,794,292 B2 10/2017 Hussain et al.
9,813,570 B2 11/2017 Han
9,923,879 B1 3/2018 Ziraknejad et al.
10,104,087 B2 10/2018 Movsisyan et al.
10,565,534 B2 2/2020 Delacourt et al.
10,897,466 B2 1/2021 Sisley et al.
11,115,186 B2 9/2021 Kurian et al.
11,157,974 B2 10/2021 Nguyen
11,228,637 B2 1/2022 Mohammed et al.
11,244,330 B2 * 2/2022 Kopikare ........... G06Q 30/0203
11,423,451 B1 * 8/2022 Chaudhari ............ G06F 16/638
11,514,496 B2 11/2022 Selvam et al.
11,587,072 B2 2/2023 Castinado et al.
2008/0215453 A1 * 9/2008 Yoshii ................ G06Q 30/0255 705/26.7
2011/0131309 A1 * 6/2011 Akiyama ................ H04L 12/14 709/223
2011/0137994 A1 * 6/2011 Kumar ................... G06Q 10/10 709/204
2011/0138050 A1 * 6/2011 Dawson .................. H04L 67/63 709/226
2011/0138051 A1 * 6/2011 Dawson ................ G06F 9/5072 709/226
2012/0226808 A1 * 9/2012 Morgan ................. G06Q 30/04 709/226
2012/0304191 A1 * 11/2012 Morgan ................ G06F 9/5088 718/105
2013/0042005 A1 * 2/2013 Boss ................... H04L 43/0876 709/226
2013/0151848 A1 * 6/2013 Baumann .............. H04L 9/3263 713/164
2013/0332250 A1 * 12/2013 Armaly .............. H04N 21/4784 705/14.23
2014/0075032 A1 * 3/2014 Vasudevan .......... H04L 41/5048 709/226
2014/0330629 A1 * 11/2014 Beadles .................. G06F 16/13 235/375
2016/0182499 A1 * 6/2016 Sharaga .................. G06F 21/82 713/156
2016/0225044 A1 * 8/2016 Lawson .............. H04L 12/1403
2016/0337356 A1 11/2016 Simon et al.
2022/0147967 A1 * 5/2022 Clark ................... G06Q 20/227
2023/0074653 A1 * 3/2023 Mawson ............ G06Q 20/0855
2024/0031373 A1 * 1/2024 Gupta ................... H04L 9/3255

FOREIGN PATENT DOCUMENTS

CN 113065890 A 7/2021
KR 20100096067 A 9/2010
KR 102193555 B1 12/2020
WO 2020148658 A2 7/2020
WO 2021057981 A1 4/2021

OTHER PUBLICATIONS

Lamotte-Schubert, Manuel. “Automatic authorization analysis.” (2015). (Year: 2015).*

* cited by examiner

SECURED ACCESS AND MANAGEMENT OF SHARED STORAGE RESOURCES

BACKGROUND

A business can utilize an online store to sell its products. For example, a business can have a website on which the company offers its products for sale. Users can browse a company's website to find products that fit their needs. While browsing, users can create a shopping cart to save products that they would like to buy at a later time. The shopping cart is associated with a user account so that the user can return to the online store at a later time and purchase the products saved in the cart.

BRIEF DESCRIPTION OF THE DRAWINGS

Detailed descriptions of implementations of the present invention will be described and explained through the use of the accompanying drawings.

Figure 1:
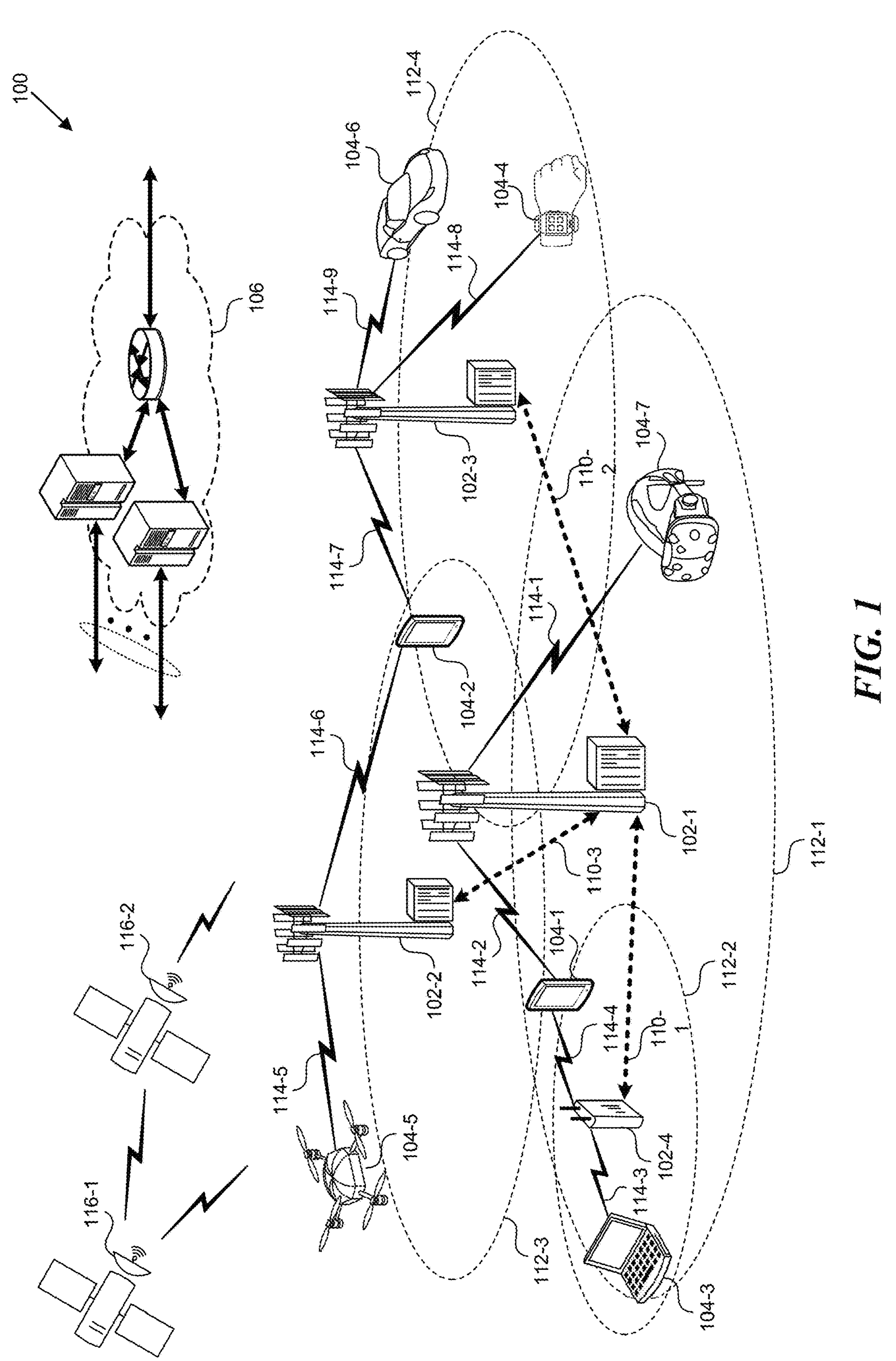
FIG. 1 illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A business can utilize an online store to purchase products (e.g., physical or virtual products, services, or any other good or service that can be acquired) that its employees need to perform their responsibilities. For example, employees can be outfitted with wireless devices (e.g., smartphones, laptops, and tablets) subscribed to wireless service plans to better connect their workforce. Purchases are often handled by supervisors or purchasing managers, for example, to refrain from having to share financial details and purchasing privileges with a large number of employees. A business can be segmented into multiple departments that handle different aspects of the business, and each of these departments can have different product needs. Accordingly, a business can include multiple purchasing managers, each responsible for coordinating purchases for employees in such purchasing manager's department. In this way, each purchasing manager can be responsible for coordinating purchases for multiple employees, which can be difficult to manage. Moreover, the purchasing managers can be aloof to the specific responsibilities of their department or the technical specifications of available products, making them poorly equipped to determine which specific products would best suit their department's needs.

To address these problems and others, the present technology relates to a storage resource that can be shared among users to enable the users to add products to the storage resource. In aspects, a storage resource can include a digital shopping cart used to store products (and/or pointers/indicators to products) for purchase. Take, for example, a business that purchases wireless devices subscribed to wireless service plans using the wireless service provider's website, as described above. A purchasing manager authorized to make purchases using a billing account registered with the wireless service provider (e.g., a billing account associated with the business or the purchasing manager) can create a shopping cart in which products are stored for future purchase. The purchasing manager can share access to the shopping cart with one or more employees in their department to enable the one or more employees to add products to the shopping cart. In aspects, the access to the shopping cart can be sent to email accounts of the one or more employees. In this way, the one or more employees are not required to have individual user accounts registered with the wireless service provider's website. After the one or more employees place the products in the shopping cart, the cart can be checked-out to purchase the products in the cart. As a result, the employees can, themselves, add the appropriate products to the shopping cart for purchase, thereby taking advantage of their increased knowledge/familiarity of their product needs and eliminating the need for a single purchasing manager to coordinate product purchases for multiple employees.

Existing technologies do not enable shared shopping carts where different users have different permissions (e.g., one set of users can add devices up to $500 while a second set of users can only add office supplies). Moreover, existing technologies do not enable shared shopping carts to be associated with a billing account and thus do not allow for purchases to be made by a user without that user having direct knowledge of the billing account information. In yet other aspects, existing technologies do not allow for one set of users to be blinded to products added to the same shopping cart by a second set of users. In contrast to these technologies, the present technology relates to a shared shopping cart that addresses one or more of these limitations.

When the shopping cart is shared, different permissions can be given to each of the one or more employees. The permissions can dictate the access that the one or more employees have to the shopping cart. For example, an employee can be given purchasing permissions such that the employee is able to check out (e.g., without approval from the purchasing manager or without being privy to financial information associated with the billing account) the entire cart, or the products that they added to the cart, using the billing account that the cart was associated with at creation (e.g., a billing account with which the purchasing manager is authorized to purchase products). The purchasing permissions can extend to a particular type of products, products having particular characteristics, or products below or above a particular cost (e.g., total cost of all products purchased or of each single product). For instance, purchasing permissions can extend to only smartphones under $500 with at least 258 gigabytes of storage. In some aspects, only products that meet the purchasing permissions will be displayed to the employee. In this way, the purchasing manager can limit the products that the employee browses to only those that the purchasing manager deems to be within the employee's needs.

In other cases, the employee can have the ability to add products to the shopping cart but purchasing the products requires the approval of the purchasing manager. For example, the products added to the cart can be visible to the purchasing manager. In aspects, the purchasing manager can see which employee placed each item into the shopping cart. The purchasing manager can then approve the shopping cart or check out the shopping cart to purchase the products saved in the cart.

When the shopping cart is shared with multiple employees, permissions provided to each employee can dictate the visibility of the shopping cart to each of the employees. For example, the hiring manager can share the shopping cart with a first employee and a second employee such that the first employee and the second employee can add products to the shopping cart. The permissions given to the employees can limit the visibility of the shopping cart to only the products placed in the shopping cart by that specific employee. In this way, an employee can be kept from viewing the products saved for purchase by other employees, which can reduce complications related to delegating different resources to each of the employees or departments. In other cases, one or more of the employees can see all contents of the shopping cart.

The visibility permissions can further extend to prices of products. For example, the purchasing manager may not want an employee to see the pricing that the business gets on a product. In this way, products can be displayed to the employee without their price. Moreover, there may be a need to blind the employees to the total cost of the shopping cart. As a result, the permissions can be adjusted to prevent the employees from being able to see the total cost of all products in the cart. Instead, the employees may able to see only the cost of products that they add to the shopping cart.

In some embodiments, an employee can be given permission to share the shopping cart with one or more other employees. For example, a purchasing manager can share the shopping cart with a first employee and provide permissions for the first employee to share the shopping cart with additional employees. Thus, the first employee can share the shopping cart to a second employee. The second employee can then add products to the shopping cart using the access provided by the first employee. The first employee can then approve the products added to the shopping cart by the second employee. In this way, the cart can be shared through a hierarchical management structure to take advantage of each employee's proximity to his or her product needs, while limiting the responsibility of making financial decision to only a select number of employees (e.g., purchasing managers).

Although described with respect to a business, the techniques, apparatuses, and systems for a shared shopping cart can similarly be used to coordinate purchases for other organizations and groups, such as a university. A university can utilize a shared shopping cart to make purchases for each of its colleges. Professors in the colleges can share a shopping cart with their students to enable the students to select or purchase products that they need for a project. The university may not want the students to have access to financial information used to pay for the products. Thus, by sharing the shopping cart to the students, the students can purchase the products that they need without having access to the university's or the college's financial information.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, IP connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-toeverything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100, including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple subcarriers (e.g., waveform signals of different frequencies) modulated according to the various radio technologies. Each modulated signal can be sent on a different subcarrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QOS) requirements and multi-terabits per second data transmission in the era of 6G and beyond, such as terabit-per-second backhaul systems, ultra-high definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

Permissions Related to a Storage Resource

Figure 2:
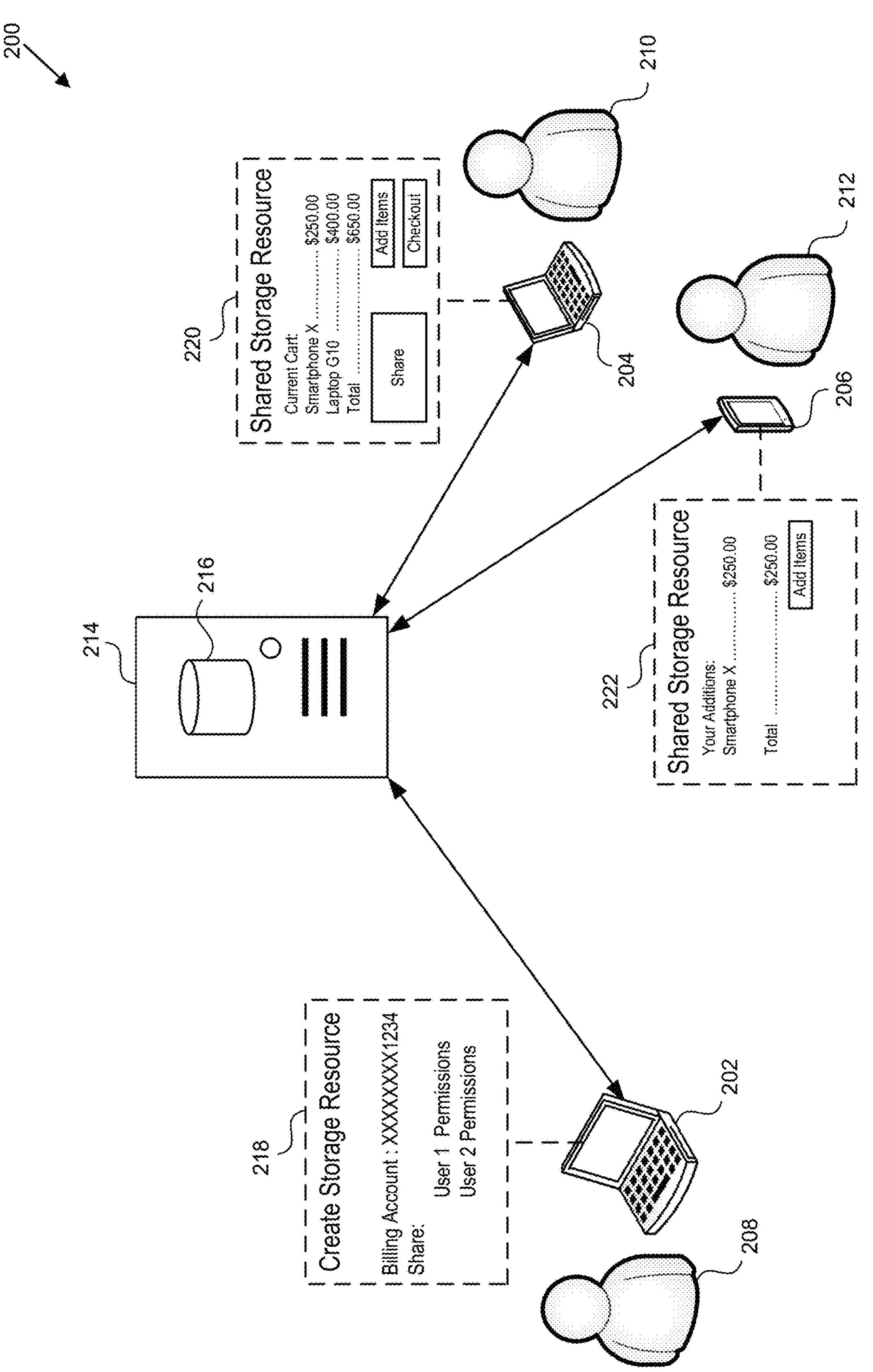
FIG. 2 illustrates an example of a shared storage resource in accordance with aspects of the present technology

FIG. 2 illustrates an example environment 200 in which a shared storage resource, such as a digital shopping cart, can be implemented. The environment 200 includes electronic devices 202, 204, and 206 associated with users 208, 210, and 212, respectively. For example, the electronic devices 202, 204, and 206 can be signed into email accounts associated with the users 208, 210, and 212, respectively. Alternatively or additionally, the electronic devices 202, 204, and 206 can be logged onto user accounts associated with the users 208, 210, and 212, respectively. In yet another example, the electronic device 202, 204, and 206 can be wireless devices subscribed to wireless service plans registered to the users 208, 210, and 212, respectively. In aspects, the electronic device 202 is a laptop, the electronic device 204 is a laptop, and the electronic device 206 is a mobile phone. In other example, however, the electronic devices 202, 204, and 206 can be any electronic devices, including smartphones, tablets, laptops, desktops, wearables (e.g., smart watches or smart glasses), vehicles, or virtual reality devices.

The environment 200 further includes a server 214 (e.g., a central server or a remote server) which hosts a platform (e.g., an ecommerce platform). In aspects, the server 214 can be associated with a wireless service provider. The users 208, 210, and 212 can utilize the electronic device 202, 204, and 206, respectively, to issue/receive commands to/from the server 214. The electronic devices 202, 204, and 206 can communicate through a wired or wireless connection with the server 214. For example, the electronic devices 202, 204, and 206 can communicate with the server through a website of the platform. One or more of the users 208, 210, and 212 can have a user account registered with the platform. In aspects, the electronic devices 202, 204, and 206 can access the platform with or without being logged into a user account registered with the platform. In some cases, additional functionality can be provided to one or more of the electronic devices 202, 204, and 206 when signed into a user account registered with the platform. For example, an electronic device may be required to be signed into a user account to acquire items/products available for acquisition on the platform. In aspects, "products" can include physical or virtual products (e.g., software, non-fungible tokens (NFTs)), services, or any other good or service that can be acquired by a user.

In some embodiments, the users 208, 210, and 212 can be members of a same organization (e.g., a university, business, or other group) that would like to purchase products or services from the platform. For example, the users 208, 210, and 212 can be employees of a business that needs wireless devices or wireless service plans to connect their workforce or complete a project. The users 208, 210, and 212 can be at various levels within the business or have different job responsibilities. For example, user 208 can be a vice president, user 210 can be a product manager, and user 212 can be an entry level employee. Thus, one or more of the users 208, 210, and 212 can lack permission to make purchases on the platform using a billing account associated with the business (e.g., to protect business financials). In some cases, businesses can circumnavigate this issue by having a single employee (e.g., user 208) coordinate and execute purchases for users 208, 210, and 212. Doing so can be overly burdensome and create the risk that the incorrect products are purchased. Thus, there is a benefit to providing a method in which users can securely purchase products through a joint order.

Techniques of the present technology provide this benefit by implementing a shared storage resource 216, such as a digital shopping cart, that can be shared to one or more users. Permissions can be provisioned to one or more of the users 208, 210, and 212 to control the accessibility of each of the users 208, 210, and 212 to the storage resource 216. The permissions can be managed by a single user (e.g., user 208) or multiple users (e.g., users 208 and 210). In aspects, the permissions can be managed by a user that initially creates the storage resource 216.

In various embodiments, the storage resource 216 can be created by any number of users and shared with any number of users. The permissions provided to each of the users can similarly vary. For ease of description, however, embodiments for implementing a shared storage resource will be discussed with reference to the example illustrated in FIG. 2. As illustrated, the storage resource 216 is created at the server 214 and shared to the users 210 and 212 in response to a command 218 from user 208. The user 208 can be authorization to purchase one or more products using a billing account registered with the platform (e.g., "Billing Account XXXXXXXX1234"). The storage resource 216 can be associated with the billing account using which the user 208 is authorized to make purchases. In this way, any purchases made through the storage resource 216 can be executed using the billing account. The billing account can include financial information that can be used to purchase products (e.g., an account number, credit information, a billing address, and so on).

The command 218 can further include a request to share the storage resource 216 or permissions to access the storage resource with user 210 and 212. Although illustrated as a single command, the command 218 can be split into different commands requesting the creation and subsequent sharing of the storage resource 216, respectively. The user 208 can select the users 210 and the users 212 with which they would like to share the storage resource 216. For each of the users 210 and 212, the user 208 can select permissions (e.g., "User 1 Permissions" and "User 2 Permissions") controlling that user's access to the storage resource 216. For example, user 210 can have permission to add products to the storage resource, see all products in the storage resource, share the storage resource, and checkout the storage resource (e.g., initiate a purchase). In contrast, user 212 can only add products to the storage resource and see the products they added. The permissions can further control the users' 210 and 212 access to the storage resource 216 or the platform generally. For example, the permissions can specify specific products (e.g., based on the products characteristics) that the users 210 and 212 are allowed to view or add to the storage resource 216.

The users 210 and 212 can issue commands to the server 214 (e.g., through the electronic devices 204 and 206, respectively) to affect the storage resource 216. The commands can be issued by interacting with user interfaces 220 and 222 provided on the electronic devices 204 and 206, respectively. For example, user 210 can select the "Add Items" button and be presented with the available products for purchase on the platform. The user 210 can select one or more products to add to the storage resource 216, and a command can be issued to the server 214 to do so. Similarly, the user 210 can select the "Share" button to issue a command to the server 214 (e.g., or directly to the electronic device 206) to provide permissions to one or more additional users (e.g., user 212). In yet another aspect, the user 210 can select the "Checkout" button to issue a command to the server 214 to purchase one or more products in the storage resource 216. One or more of the commands can be combined into a single command. For example, the user 210 could select a "Buy Now" button that issues a command to both add a product to the storage resource 216 and checkout one or more product from the storage resource 216.

It should be noted that the user interfaces 220 and 222 can be different based on the permissions assigned to each user. For example, user 210 was given permission to see all products in the storage resource 216, to add items to the storage resource 216, to share the storage resource 216, and to checkout the storage resource 216. Thus, the user interface 220 displays all of the products (e.g., "Smartphone X" and "Laptop G10") in the storage resource 216 and "Share," "Add Items," and "Checkout" buttons. In contrast, the user 212 was only given permission to see the products they added to the storage resource 216 and to add products to the storage resource 216. Thus, the user interface 222 only includes the products that the user 212 added to the storage resource 216 (e.g., "Smartphone X") and the "Add Items" button. In some embodiments, the user interfaces 220 and 222 can hide the cost of the products in the storage resource 216. Moreover, in some cases, the products displayed for adding to the storage resource 216 can vary based on the permissions assigned to each user, as discussed in greater detail with respect to FIG. 5 and elsewhere in this disclosure.

Figure 3:
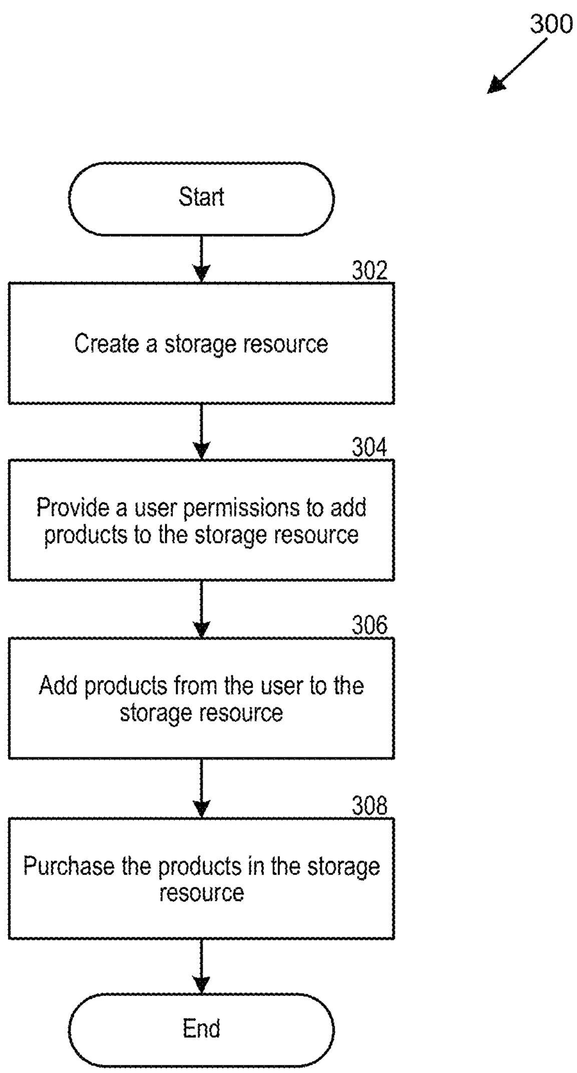
FIG. 3 illustrates an example method for implementing a shared storage resource.

FIG. 3 illustrates an example method 300 for implementing a shared storage resource. The method 300 can be performed at a server (e.g., server 214 of FIG. 2) hosting a platform (e.g., an ecommerce platform). The platform can include a billing system that processes purchases through the platform. The platform can also include an account management system that stores account information for a registered user. For example, the account information can include billing/financial information. In aspects, the platform can include a business's online store displayed on its website. In some embodiments, the business can include a wireless service provider that sells wireless services and wireless devices. In general, the method 300 can be performed to implement a storage resource, such as a digital shopping cart.

At 302, a storage resource is created. A first user with authorization to purchase one or more products using a billing account registered with the platform can issue a command to create a storage resource in which products sold by the platform can be saved for a future purchase. As a specific example, the first user can be an employee of a company that has authorization to make purchases on behalf of the company. The first user can have a user account registered with the platform. The billing account can be a billing account associated with the specific employee or with the company generally. The billing account can include financial information that can be used to purchase products (e.g., an account number, credit information, a billing address, and so on). In some cases, the first user can add one or more products sold on the platform to the storage resource, thus creating the storage resource. In other cases, the first user can create the storage resource without adding products to the storage resource. In general, the storage resource can be created in response to a command from the first user. The storage resource can be associated with a user account of the first user.

At 304, permissions to add one or more products to the storage resource are provided to one or more users. For example, the first user can issue a command to share the storage resource (e.g., by selecting a share button on the platform) with a second user different from the first user. In response to the command, access to the storage resource can be provided to the second user. In some cases, the access to the storage resource can be transmitted to an email address of the second user. For instance, a web address used to navigate to the storage resource can be transmitted to the email address. When the second user navigates to the web address, the products sold by the platform can be presented to the user. When the user selects one or more of the products to add to the storage resource, the products can be added to the storage resource created by the first user. In this way, the second user need not have a user account registered with the platform. In other cases, the access to the storage resource can be shared using a user account of the second user that is registered with the platform. In doing so, access to the storage resource can be transmitted to an email address, phone number, or other contact information of the second user that is associated with the second user's account. Alternatively or additionally, the permissions can appear as a notification on the second user's account. In some embodiments, the storage resource can be available to add products into when the second user is logged into his or her user account.

The first user is able to provide different permissions to different users. The permissions can specify the operations that a user is allowed to perform with respect to the storage resource. The permissions can enable a user to not only add products to the storage resource but also purchase the products (e.g., using the billing account with which the user that created the storage resource is authorized to make purchases). Purchasing permissions can be described in greater detail with respect to FIG. 4.

In some embodiments, the permissions can be configured to adjust the visibility of a user to the storage resource or to products that can be added to the storage resource. For example, the first user can share the storage resource to multiple users (e.g., the second user and a third user) and the permission provided to the second user can prevent the second user from viewing products in the storage resource that he or she did not add. Specifically, the second user can be prevented from seeing products added by the first user or the third user. In aspects, the permissions can keep the total cost of the products in the storage resource from being visible to the second user. In other cases, all products in the storage resource or the cost of all of the products in the storage resource can be visible to the second user. In yet other aspects, the second user can be blinded to the cost of products sold on the platform. For example, when the second user accesses the platform through the permissions provided by the first user, the platform can display the products to the second user without the price of the products. The price of the products can similarly be hidden when the products are added to the storage resource.

In some cases, the permission can enable a user to edit contents of the storage resource added by a different user. For example, the second user can remove one or more products added to the storage resource by the third user. In aspects, a user can only edit products added to a storage resource by specific users. For example, the second user can edit products added to the storage resource by the third user but cannot edit products added to the storage resource by the first user. In other cases, a user can only edit the contents of the storage resource that he or she added.

The permissions can provide additional capabilities to the user to which they are provided. For example, the permissions can be provided from the first user to the second user to enable the second user to access the storage resource. The permissions can include sharing permission that enable the second user to share the storage resource to one or more additional users. For instance, the second user can share access to the storage resource with the third user to enable the third user to add products to the storage resource. The second user can provide additional permissions to the third user similar to the permissions that the first user can provide to the second user. In aspects, the permissions provided to the third user can require that the second user approve the products added to the storage resource prior to their purchase. Alternatively, the second user can provide purchasing permissions to the third user.

At 306, one or more products can be added to the storage resource in response to a command to do so from a user that has received permission to add products to the storage resource. In aspects, when adding one or more products to the storage resource, physical products are not literally added within the storage resource but instead indications of products available for purchase on the platform can be stored in the storage resource. For example, an image, product name, price, or a navigational address to a product can be stored in the storage resource. In some cases, adding a product to the storage resource can reserve a specified quantity of that product from an available inventory. In this way, the storage resource can be used to reserve a product for purchase without worrying about running out of stock of the product.

The user can issue a command to add the one or more products to the storage resource. For example, the second user can utilize an access to the storage resource to navigate to the platform or log into his or her user account on the platform. The second user can select one or more of the displayed product to add to the storage resource. In aspects, the second user can select whether to add the products to a new storage resource or to the shared storage resource. In other cases, the products can be added to the shared storage resource by default. The products can be added to the shared storage resource to the extent that it is allowed by the provided permissions. For instance, if the permissions specify that only particular products can be added to the storage resource, the products added to the storage resource can be limited to those particular products. Thus, when the second user attempts to add, to the storage resource, products that do not conform to the specified characteristics, the products may not be added to the storage resource. Instead, the second user can be notified that the products extend beyond the allowable products that can be added to the storage resource.

In aspects, the products can be added to the storage resource in association with the user that added them. In this way, other users (e.g., a user that created the storage resource or is in charge of approving purchases) can see which users added which products to the storage resource. As a result, the edits that each user has made to the storage resource can be tracked. In aspects, this enables a user in charge of approving purchases to better approve or deny the purchases of these items.

At 308, the products in the storage resource can be purchased using the billing account associated with the storage resource. In some cases, the purchases can require a credit decision to be made. For example, when financing is needed to complete the purchase, the platform can require the credit worthiness of the purchasing entity to be determined prior to accepting the purchase. In this case, the credit information associated with the billing account (e.g., credit information of the first user or the larger organization with which the first user is associated) can be used to determine credit worthiness (e.g., thereby leveraging the likely greater credit worthiness of the organization). Thus, the shared storage resource enables a user associated with an organization to utilize the financial information of the organization for a single purchase without delegating large-scale financial decision making to that user.

Figure 4:
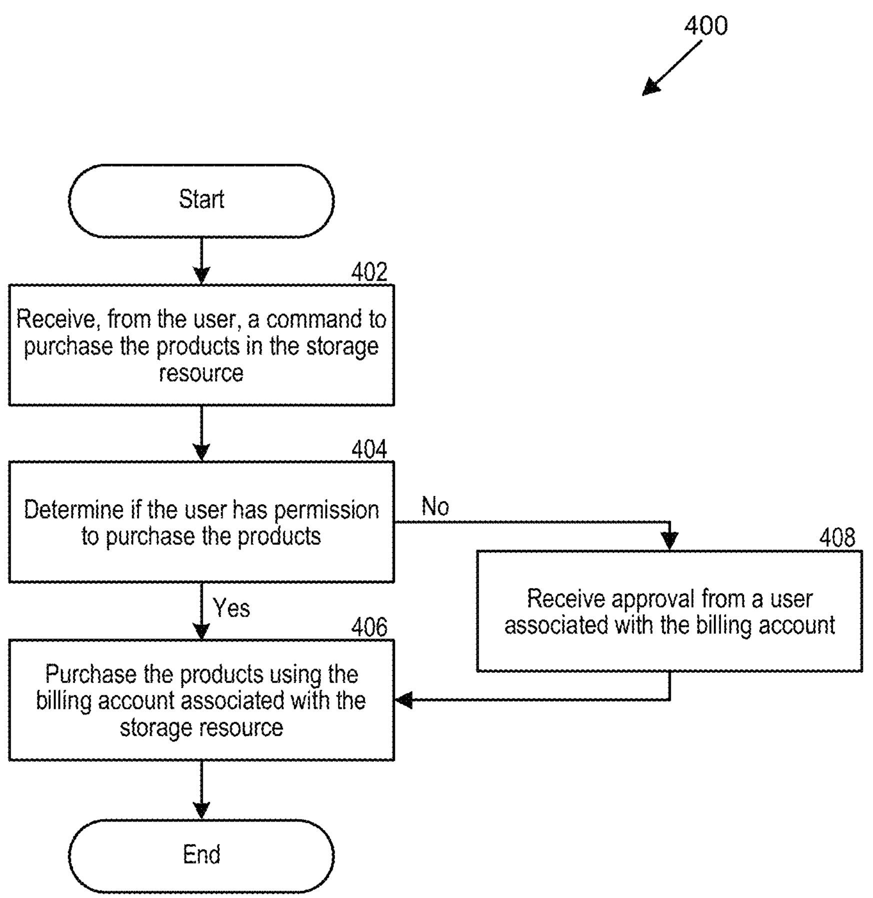
FIG. 4 illustrates an example method for purchasing products using a shared storage resource.

FIG. 4 illustrates an example method for purchasing products using a shared storage resource. In aspects, the method 400 can describe purchasing products that are stored in the shared storage resource. For example, indications of the products can be stored in the storage resource. When a purchase is executed, products corresponding to the indicated products can be associated with an order and purchased such that payment can be collected by the platform (e.g., using the billing account associated with the storage resource). A business selling products on the platform can then organize the purchased products and provide them to the purchaser (e.g., through physical or digital transfer).

At 402, a command to purchase the products in the storage resource (e.g., products corresponding to those indicated in the storage resource) is received from a user. In aspects, the user can be the second user with which the storage resource was shared. As discussed above, the second user can have purchasing permissions that enable the second user to purchase products stored in the storage resource. Thus, the permissions can enable the second user to not only add products to the storage resource but also purchase the products (e.g., using the billing account with which the user that created the storage resource is authorized to make purchases). For example, the first user can provide purchasing permissions to the second user such that the second user can check out the storage resource and purchase the products in the storage resource (e.g., without approval from the first user) using the billing account with which the first user is authorized to make purchases. The second user can have permission to purchase all products in the storage resource or only the products they added to the storage resource. In some cases, the second user is required to be logged into a user account registered with the platform to purchase the products in the storage resource. The purchase permissions can have restrictions similar to the restrictions that specify which products can be added to the storage resource. For example, the second user can have permission to purchase products of a particular type, having particular features, or up to or above a particular cost (e.g., cost of all products in the storage resource or of only the products added to the storage resource by the second user). Alternatively, the permissions can be such that the second user can add products to the storage resource but cannot purchase the products.

At 404, it is determined whether or not the user has permissions to purchase the products. the first user can provide purchasing permissions and access to the storage resource to the second user (e.g., through a server hosting the platform). In aspects, the second user can purchase only the products added to the storage resource by the second user. Alternatively, the second user can purchase all of the products in the storage resource, including those added by other users. Thus, the determination on whether the user has permissions to purchase the products can vary with respect to the different contents in the storage resource. If purchasing permissions were provided to the second user with which the access to the storage resource was shared, the method can continue at 406 where the products in the storage resource can be purchased in response to a command from the second user to purchase the products.

Alternatively, if the second user does not have permissions that enable them to purchase one or more products in the storage resource without the approval of the first user, the method 400 can continue at 408 where approval from the first user is requested. For example, the second user can add products to the shared storage resource, and the first user can return to the storage resource after the products have been added to purchase the products. In some cases, the second user can specifically request to check out the products in the storage resource (e.g., at 402). The first user can then receive the request to check out the products in the storage resource and approve or deny the request. In this way, the permissions to access the storage resource can be provided such that approval from the first user is needed to purchase the products. If the request is approved, the products can be purchased at 406. If the request is denied, the purchase can be canceled. In some embodiments, the first user can edit the contents of the storage resource. For example, the first user can remove one or more products added to the storage resource by the second user. The altered storage resource can then be checked out to purchase the remaining items at 406.

At 406, the products can be purchased using the billing account with which the first user is authorized to make purchases. In aspects, the second user is not required to know the financial information associated with the billing account. For example, payment information associated with the billing account need not be known by the second user. Instead, the purchases can be made using the billing account with which the storage resource is associated (e.g., prior to the second user adding the products to the storage resource) based on the products being purchased from the shared storage resource.

Figure 5:
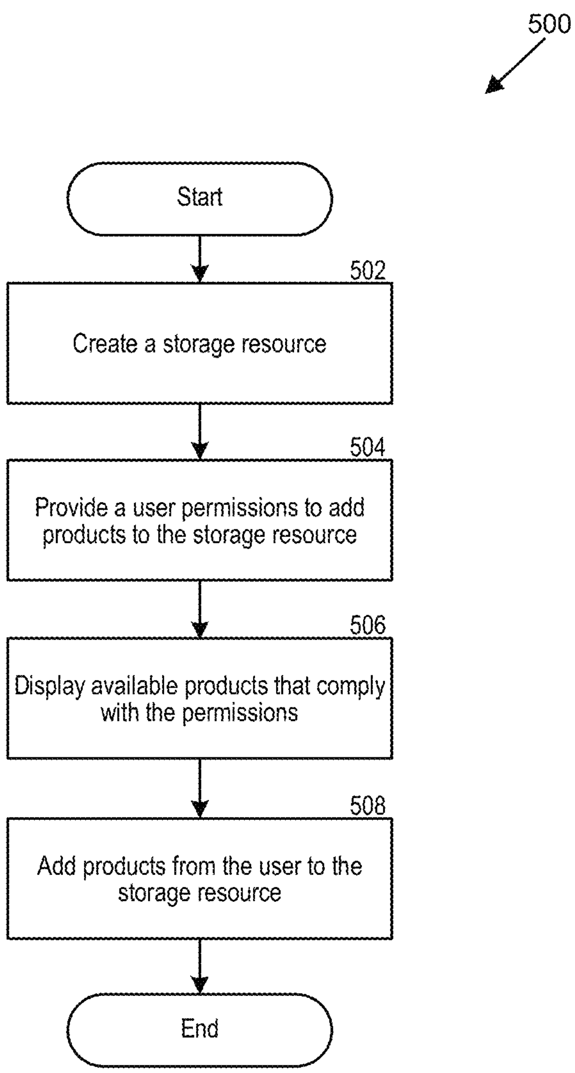
FIG. 5 illustrates an example method for displaying products for addition to a shared storage resource.

FIG. 5 illustrates an example method 500 for displaying products for addition to a shared storage resource. In aspects, the method 500 can describe controlling the visibility of products that a user is not entitled to add to a storage resource or purchase. For example, the first user that shares a storage resource may wish to limit the product that the second user sees to only those that they are allowed to add to the storage resource or purchase. One reason for this may be that the first user does not want the second user to get distracted by other products that are beyond the second user's needs or beyond the products that the business has approved the purchase of. Thus, there is a benefit in providing a technique to limit the visibility of a user to products that are within the scope of their permissions.

At 502, a storage resource is created. In general, the storage resource can be created through a similar process as described at 302 of FIG. 3 and elsewhere in this disclosure. Thus, additional description of generation of a storage resource is omitted for the sake of brevity.

At 504, the second user is provided permissions to add products to the storage resource. In general, these permissions can be provided in a similar manner as described at 304 of FIG. 3 and elsewhere in this disclosure. In aspects, however, the permissions to add one or more products to the storage resource or purchase one or more products extends only a subset of products that meet particular characteristics. For example, the first user can alter the permissions such that the second user is only able to add products of a particular type, having particular features, or costing more or less than a particular amount. As a specific example, the permission can only enable the second user to add smartphones or smartwatches. Alternatively or additionally, the permissions to add products to the storage resource could extend only to products from a certain manufacturer or having particular capabilities (e.g., 5G capability). In yet other aspects, the permission can limit the products that can be added to the storage resource to products less than a maximum cost or greater than a minimum cost (e.g., total cost of all products added to the cost or of each individual product).

At 506, products available for purchase on the platform that satisfy the particular criteria specified by the permissions are displayed to the second user (e.g., on an associated device). In some cases, products that do not meet the characteristics of purchasable products as specified by the permissions are not displayed to the second user. For example, when navigating to the platform using the access to the storage resource provided to the second user from the first user, the platform can display only products that meet the specified characteristics (e.g., smartphones with 5G capability that are less than $500). In other cases, all products can be displayed to the second user, but only the products that meet the specified characteristics can be added to the storage resource. In yet other aspects, any product can be added to the storage resource but only the products that meet the specified characteristics can be purchased.

At 508, one or more products available for purchase on the platform are added to the storage resource in response to a command from the second user. In general, products can be added to the storage resource through a similar process as described at 306 of FIG. 3 and elsewhere in this disclosure. Thus, additional description of this operation is omitted for the sake of brevity.

Computer System

Figure 6:
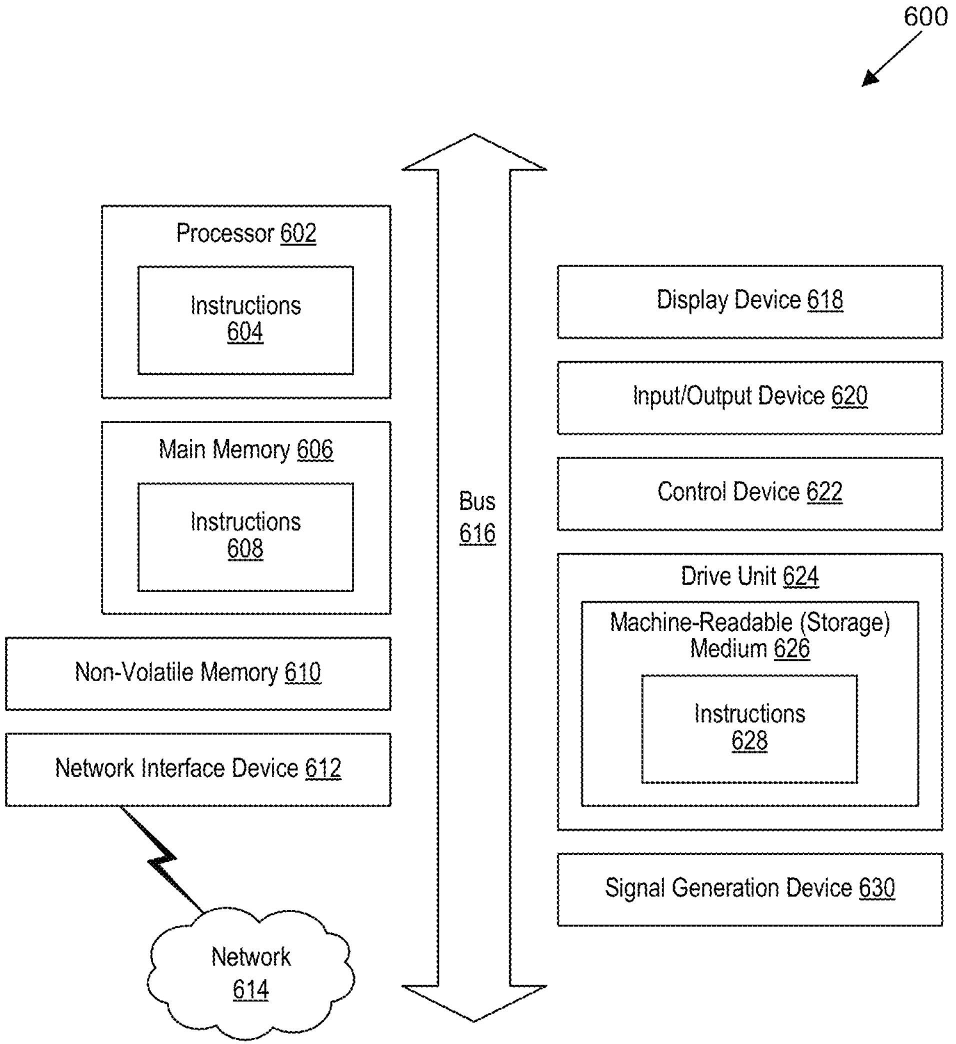
FIG. 6 illustrates an example computer system in which at least some aspects of the present technology can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, which stores instructions 628 to be executed by the one or more processors 602, and a signal generation device 630, all of which are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system, such as a mesh of computer systems, or can include one or more cloud components in one or more networks. Where appropriate, one or more computer systems 600 can perform operations in real time, in near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, and 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; and the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps or employ systems having blocks in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method comprising:

receiving, from a first device associated with a first user, a first command to create a storage resource usable to acquire products available for acquisition on a platform using a billing account with which the first user is permitted to acquire the products available for acquisition on the platform;

responsive to receiving the first command, creating, at a server hosting at least a portion of the platform, a storage resource usable to store an indication of a subset of the products available for acquisition on the platform using the billing account;

receiving, from the first device, one or more second commands;

responsive to receiving the second commands, providing, to a second device associated with a second user different from the first user and using an identifier of the second user, a first set of permissions to add an indication of one or more first products from the platform to the storage resource;

responsive to receiving the second commands, providing, to a third device associated with a third user different from the first user and the second user, a second set of permissions to add an indication of one or more second products from the platform to the storage resource;

receiving, from the second device, a third command to add the indication of the one or more first products to the storage resource;

responsive to receiving the third command:

adding the indication of the one or more first products to the storage resource such that the indication of the one or more first products appears within the storage resource on a display of the second device while the second device is accessing the platform, and blinding the third device from the indication of the one or more first products in the storage resource such that the indication of the one or more first products does not appear within the storage resource on a display of the third device while the third device is accessing the platform;

receiving, from the third device, a fourth command to add the indication of the one or more second products to the storage resource;

responsive to receiving the fourth command, adding the indication of the one or more second products to the storage resource such that the indication of the one or more second products appears within the storage resource on the display of the third device while the third device is accessing the platform;

receiving a fifth command to execute an acquisition of the one or more first products and the one or more second products based on the indication of the one or more first products and the indication of the one or more second products within the storage resource; and responsive to receiving the fifth command, executing the acquisition of the one or more first products and the one or more second products using the billing account with which the first user is permitted to acquire the products available for acquisition on the platform.

2. The method of claim 1, wherein:

the first set of permissions further enables the second user to acquire the one or more first products using the billing account; and the method further comprises:

receiving, from the second user, a sixth command to execute the acquisition of the one or more first products, wherein executing the acquisition of the one or more first products using the billing account is responsive to receiving the sixth command.

3. The method of claim 1, wherein the first set of permissions specifies that the indication of the one or more first products are added to the storage resource upon satisfying a particular criteria, wherein the particular criteria includes the one or more first products having a particular feature, being of a particular type, or having no more than a maximum cost.

4. The method of claim 1, wherein:

the first set of permissions enables the second device to issue a sixth command to provide the second set of permissions to the third device; and the second set of permissions is provided to the third device based on reception of the sixth command from the second device.

5. The method of claim 1, further comprising receiving, from the first device, approval to acquire the one or more first products using the billing account, wherein executing the acquisition of the one or more first products using the billing account occurs in response to receiving the approval.

6. The method of claim 1, wherein the first set of permissions enables the second device to issue a sixth command to remove the indication of at least one of the one or more second products from the storage resource.

7. The method of claim 1, wherein the second user is blinded to a cost of the one or more first products.

8. The method of claim 1, wherein:

an indication of the storage resource is visible to the first device; and the indication of the one or more first products are added to the storage resource in association with the second user such that the storage resource indicates that the second user is responsible for the indication of the one or more first products having been added to the storage resource.

9. The method of claim 1, wherein the first set of permissions to add the one or more first products to the storage resource is provided using an email address associated with the second user.

* * * * *